United States Patent [19]

de Jaeger et al.

[11] Patent Number: 5,230,875

[45] Date of Patent: Jul. 27, 1993

[54] POLY(DICHLOROPHOSPHAZENES)-/POLY(ORGANOPHOSPHAZENES) HAVING REGULATED MOLECULAR WEIGHTS

[75] Inventors: Roger de Jaeger, Chereng; Guy Pagniez, Poe de l'Escar; Philippe Potin, Billere, all of France

[73] Assignee: Atochem, Puteaux, France

[21] Appl. No.: 601,298

[22] Filed: Oct. 22, 1990

[30] Foreign Application Priority Data

Oct. 20, 1989 [FR] France .............................. 89 13752

[51] Int. Cl.$^5$ .......................... C01B 25/10; C09K 3/00
[52] U.S. Cl. ................................ 423/300; 252/182.34
[58] Field of Search ..................... 423/300; 252/182.34

[56] References Cited

U.S. PATENT DOCUMENTS 4,226,840 10/1980 Fieldhouse et al. ................. 423/300
4,327,064 4/1982 Fieldhouse et al. ................. 423/300
4,554,113 11/1985 Abouchakra et al. ............... 423/300
4,693,876 9/1987 De Jaeger et al. ................. 423/300
4,867,957 9/1989 Sennett ................................ 423/300

FOREIGN PATENT DOCUMENTS 26685 4/1981 European Pat. Off. .
132188 1/1985 European Pat. Off. .
178997 4/1986 European Pat. Off. .

Primary Examiner—Wayne Langel
Attorney, Agent, or Firm—Burns, Doane, Swecker & Mathis

[57] ABSTRACT

The molecular weights of the poly(dichlorophosphazenes), and of the poly(organophosphazenes) produced therefrom, are controlledly regulated by heating such poly(dichlorophosphazenes) in the presence of an effective molecular weight-regulating amount of phosphorus oxychloride.

12 Claims, No Drawings

POLY(DICHLOROPHOSPHAZENES)/POLY(ORGANOPHOSPHAZENES) HAVING REGULATED MOLECULAR WEIGHTS

BACKGROUND OF THE INVENTION

1. Field of the Invention

The present invention relates to the regulation of the molecular weights of the poly(dichlorophosphazenes) and of the poly(organophosphazenes) produced therefrom.

2. Description of the Prior Art

The poly(organophosphazenes) constitute a vast category of polymers, all of which include a skeleton or backbone comprising an —N=P— recurring structural unit onto which organic groups of various types, such as alkoxy, aryloxy, sulfur, amino, etc., have been grafted. This diversity in structure provides the poly(phosphazenes) with a particularly wide range of potential applications, including, inter alia, use as flame-retardant insulating or padding foams, flame-retardant coatings, special elastomers, conductive polymers, and biomedical appliances.

The entire range of these poly(phosphazenes) can only be prepared on an industrial scale from a common intermediate, namely, poly(dichlorophosphazene). The conversion of this intermediate to a poly(organophosphazene) is carried out by substituting the chlorine atoms by an organic substituent according to the following reaction scheme:

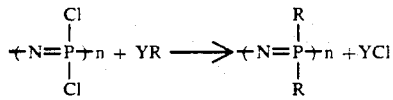

where R is any desired organic radical or group, in particular those indicated above, and Y is a metal, typically an alkali metal, or a hydrogen atom.

Irrespective of the type of substitution, it is necessary to have a poly(dichlorophosphazene) starting material, the molecular weight of which is adapted to the desired final application. It is therefore necessary to control the level of such molecular weight.

To date, three routes for the preparation of poly(dichlorophosphazene) have been described. Allcock and Kugel (U.S. Pat. No. 3,370,020) describe heating hexachlorocyclotriphosphazene until about 50% of this precursor has been converted into the polymer. In this manner, the poly(dichlorophosphazene) contains only a small proportion of crosslinked gel. It is essentially present in linear form and is thus soluble, permitting it to be converted by substitution, as follows:

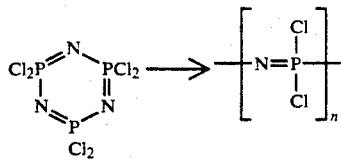

It is not possible by this process to terminate the chain growth at the desired level; therefore, the molecular weights obtained are random and, in general, very high. A different process for preparing poly(dichlorophosphazene) entails polycondensing oligomers of the $Cl_3P$—$(N=PCl_2)_x$—$Cl+PCl_6^-$ type in the presence of ammonium chloride (Hornbacker and Li, U.S. Pat. No. 4,198,381), but this procedure provides only very low molecular weights.

Most recently, a process has been described which entails polycondensation of N-dichlorophosphoryl-P-trichlorophosphazene (De Jaeger, Heloui and Puskaric, French Patent 2,466,435) according to the following scheme:

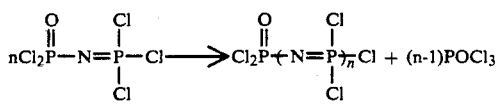

This process produces no crosslinked gels whatsoever, making it possible to carry out the polycondensation up to complete conversion, the chain growth being effected gradually as a function of the residence time. The level of molecular weight can thus be precisely controlled by varying the duration of the polycondensation.

In French Patent 2,571,710, De Jaeger, Pagniez and Potin describe carrying out at least the polycondensation stage in a medium in which both the monomer and the polymer are soluble, with the goal of obtaining high degrees of polycondensation in a reproducible manner.

It is possible to ensure that the molecular weights are regulated by adding a chain-limiting agent to the polycondensation product (Pagniez, Passimourt, Potin, French Patent 87/09,406). However, it should be appreciate that this method of regulation by using a limiting agent essentially provides only low or medium molecular weight levels.

Allcock and Gurdner (U.S. Pat. No. 3,917,802) describe a process by means of which the molecular weight of the poly(dichlorophosphazene) can be reduced. The process entails heating this polymer in the presence of phosphorus pentachloride, causing scission of the P-N bonds in the polymer chains. This method has the drawback of requiring a reactant which is very corrosive and difficult to handle, since it is present in the form of solid lumps.

SUMMARY OF THE INVENTION

Accordingly, a major object of the present invention is the provision of an improved process for controlledly reducing the molecular weight of any starting material poly(dichlorophosphazene).

Another object of this invention is the provision of poly(organophosphazenes) prepared from such controlled molecular weight poly(dichlorophosphazenes).

Briefly, the present invention features heating poly(dichlorophosphazene) in the presence of phosphorus oxychloride to regulate the molecular weight thereof.

DETAILED DESCRIPTION OF THE PREFERRED EMBODIMENTS OF THE INVENTION

More particularly according to the present invention, in a first preferred embodiment thereof, a standard amount of phosphorus oxychloride can be added to the poly(dichlorophosphazene), thus promoting a decrease in the molecular weight thereof to a value below the desired level, and then to increase it to such desired level.

In a second preferred embodiment of the invention, the precise amount of phosphorus oxychloride required for decreasing the molecular weight to the precise level can be introduced.

If the procedure in which a standard amount of phosphorus oxychloride is added is employed, i.e., the molecular weight is decreased below the desired level and then increased to this level, the first operation is carried out by heating the mixture in a sealed reactor and the second operation by reducing the concentration of phosphorus oxychloride in the liquid phase of the reactor by opening this reactor either completely or partially to the atmosphere.

Thus, if a poly(dichlorophosphazene) in pure state is available, emanating either from the polymerization of hexachlorocyclotriphosphazene or by the bulk polycondensation of N-dichlorophosphoryl-P-trichlorophosphazene, the removal of excess phosphorus oxychloride is accomplished by flushing the reactor with an inert gas, or by applying a partial vacuum to the reactor, or by maintaining the reactor at atmospheric pressure, under an inert gas, and by connecting its gas phase with a cooling zone onto which the phosphorus oxychloride can condense. The same operations can be carried out when the poly(dichlorophosphazene) is dissolved in a solvent whose boiling point is higher than that of the temperature of reaction.

In contrast, when the poly(dichlorophosphazene) is dissolved in a solvent whose boiling point is below the reaction temperature, it is possible to reduce the phosphorus oxychloride concentration in the liquid phase either by maintaining constant boiling of the solvent under an appropriate pressure, or by distilling off one or more fractions of this solvent, which fractions, if desired, can be replaced by fresh solvent.

If it is desired to decrease the molecular weight directly to the desired level, it is obviously necessary to determine beforehand the amount of phosphorus oxychloride to be used in the reaction. This amount depends on the initial molecular weight level to be reduced, the final molecular weight level to be achieved, and the phosphorus oxychloride concentration at equilibrium between the liquid phase of the polycondensation and the gas phase of the reactor, such equilibrium being determined by the temperature, the concentration of the poly(dichlorophosphazene) in an optional solvent, the ratio by volume of the two phases and the relative size of the cooling zones of the reactor.

If it is desired to attain the desired molecular weight level directly, without having to subsequently increase it to such level, it will be necessary to establish the relationship between the "molecular weight and the amount of phosphorus oxychloride introduced" by fixing all other parameters.

The amounts of phosphorus oxychloride to be added to the poly(dichlorophosphazene) can thus be varied over a broad range. However, these amounts are most typically less than 20% (moles of phosphorus oxychloride, per $NPCl_2$ unit of poly(dichlorophosphazene)), and more typically range from 0.2% to 10%. The temperature at which this reduction in the molecular weight has to be carried out depends of course on the physical conditions available and on the desired rate. This temperature advantageously ranges from 200° to 350 C.; in actual practice, the reaction is typically carried out at a temperature ranging from 230° to 300° C. The duration of this operation of reducing the molecular weight can in general range from several tens of minutes to several hours, for example from 2 to 20 hours.

In order to further illustrate the present invention and the advantages thereof, the following specific examples are given, it being understood that same are intended only as illustrative and in nowise limitative.

EXAMPLE 1

This example illustrates the case by which it is possible to modify the molecular weight of the starting poly(dichlorophosphazene) by introducing thereto, or removing phosphorus oxychloride therefrom.

The operation was carried out in a stirred 2-1 reactor equipped with heating by means of a heat transfer medium, a reflux condenser whose temperature could be controlled from 20° to 150° C. and which itself was connected to a descending condenser controlled at 20° C. Downstream of this descending condenser was a receiver for collecting the condensates of the reactor. The reactor was likewise equipped with a reactant inlet, a sampling device, systems for pressurizing and flushing with nitrogen, as well as with a thermocouple for measuring the internal temperature.

1,224 g of N-dichlorophosphoryl-P-trichlorophosphazene were introduced into this reactor which was maintained under a nitrogen pressure and whose reflux condenser had a temperature of 130° C., and then heated at 250° C. A release of phosphorus oxychloride was observed over a period of 8 hours. When this release was complete, the top of the reactor was flushed with a stream of nitrogen. Again a release of phosphorus oxychloride was observed, which ceased after 30 minutes of flushing.

The reactor was again placed under a nitrogen pressure, and 1,710 g of trichlorodiphenyl were introduced. The mixture was maintained at 250° C.

The course of the polycondensation was monitored by taking samples and measuring the intrinsic viscosity of the poly(dichlorophosphazene) in THF, to which 0.85% of LiBr and 0.20% of trimethylchlorosilane were added. The polycondensation was terminated after 23 hours, at which point the intrinsic viscosity had reached 70 ml/g. At this stage, the following sequence of operations was carried out:

(1) The temperature of the reflux condenser was controlled at 20° C., and 10.8 g of phosphorus oxychloride, which corresponded to 1.02 mol %, were introduced into the reactor. The mixture was maintained at 276° C. for 10 hours, after which the intrinsic viscosity had decreased to 61 ml/g;

(2) The reflux condenser was again controlled at 130° C., the top of the reactor was flushed with nitrogen, and the reaction mixture was maintained at 280° C. After 5 hours, the intrinsic viscosity of the poly(dichlorophosphazene) had increased to 71.8 ml/g;

(3) Procedure (1) was repeated, using 5.5 mol % of phosphorus oxychloride. After 12 hours, the intrinsic viscosity had decreased to 29 ml/g;

(4) Procedure (2) was repeated, starting with the product of procedure (3), and after 8 hours the intrinsic viscosity of the poly(dichlorophosphazene) had increased to 71 ml/g.

EXAMPLE 2

This example illustrates the relationship that can be established between the phosphorus oxychloride introduced and the molecular weight attained at equilibrium.

In the same reactor and under the same conditions as those described in Example 1, a polycondensation reaction was carried out which was terminated after 24 hours, at which point the poly(dichlorophosphazene) had attained an intrinsic viscosity of 72 ml/g. The reflux condenser was then controlled at 20° C. and, beginning therefrom, successive amounts of phosphorus oxychloride were introduced into the reactor.

After each addition, reaction of the mixture at 285° C. was maintained for 14 hours, after which the intrinsic viscosity was measured. The mixture was maintained under the same conditions for another 7 hours, after which the intrinsic viscosity was again measured. In this manner, it was possible to ensure that the depolycondensation reaction had been adjusted to its state of equilibrium.

The results obtained are reported in the Table below:

TABLE

|    | $POCl_3$ (% M) | I.V. (ml/g) |
|----|----------------|-------------|
| 1  | 0              | 71.83       |
| 2  | 0.65           | 64.64       |
| 3  | 1.023          | 60.90       |
| 4  | 1.363          | 60.17       |
| 5  | 1.691          | 52.58       |
| 6  | 2.042          | 49.86       |
| 7  | 2.685          | 41.43       |
| 8  | 3.296          | 38.19       |
| 9  | 3.856          | 34.66       |
| 10 | 4.527          | 31.58       |
| 11 | 5.509          | 29.04       |

From this Table, the following relationship can be derived for purposes of illustration:
(correlation coefficient: 0.99)

$$\log y = -0.1789x + 4.2743$$

where y is the intrinsic viscosity of the poly(dichlorophosphazene) (ml/g) and x is the mol % of $POCl_3$, relative to the starting amount of poly(dichlorophosphazene).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for controlledly regulating the molecular weight of a poly(dichlorophosphazene), comprising heating such poly(dichlorophosphazene) in the presence of an effective molecular weight-regulating amount of phosphorus oxychloride.

2. The process as defined by claim 1, comprising heating a poly(dichlorophosphazene) having predetermined molecular weight in the presence of an effective molecular weight-reducing amount of phosphorus oxychloride to decrease said molecular weight below a predetermined value, next reducing the amount of said phosphorus oxychloride in the medium of reaction, and continuing heating of the poly(dichlorophosphazene) until the molecular weight thereof is increased to said predetermined value.

3. The process as defined by claim 1, comprising heating a poly(dichlorophosphazene) having predetermined molecular weight in the presence of a predetermined molecular weight-regulating amount of phosphorus oxychloride to directly adjust the molecular weight of said poly(dichlorophosphazene) to a predetermined value.

4. The process as defined by claim 1, said amount of phosphorus oxychloride not exceeding 20 mol % per $NPCl_2$ unit.

5. The process as defined by claim 4, said amount of phosphorus oxychloride ranging from 0.2% to 10% by weight of said poly(dichlorophosphazene).

6. The process as defined by claim 1, carried out at a temperature ranging from 200° to 350° C.

7. The process as defined by claim 6, carried out at a temperature ranging from 230° to 300° C.

8. The process as defined by claim 1, said poly(dichlorophosphazene) being dissolved in an inert solvent therefor.

9. A process for controlledly regulating the molecular weight of a poly(dichlorophosphazene), comprising heating such poly(dichlorophosphazene) in the presence of an effective amount of a molecular weight-regulating compound consisting essentially of phosphorus oxychloride.

10. A composition of matter comprising a poly(dichlorophosphazene) ("PDCP") and an effective PDCP molecular weight-regulating amount of phosphorus oxychloride.

11. The composition of matter as defined by claim 10, said amount of phosphorus oxychloride not exceeding 20 mol % per $NPCl_2$ unit.

12. The composition of matter as defined by claim 11, said amount of phosphorus oxychloride ranging from 0.2% to 10% by weight of said poly(dichlorophosphazene).

* * * * *